Nov. 30, 1965 H. W. TEMPLETON 3,220,756
RESILIENT BOOT SEAL
Filed April 13, 1964 2 Sheets-Sheet 1
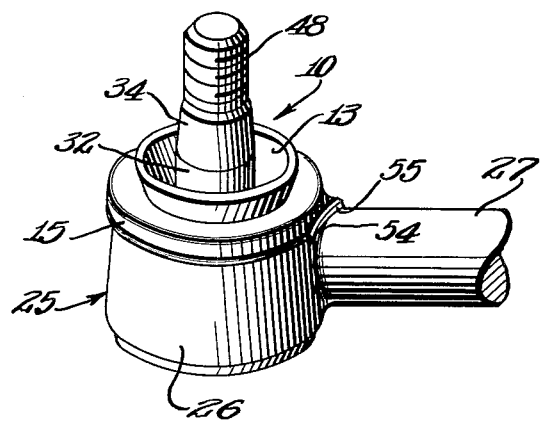
Fig. 1
Fig. 6
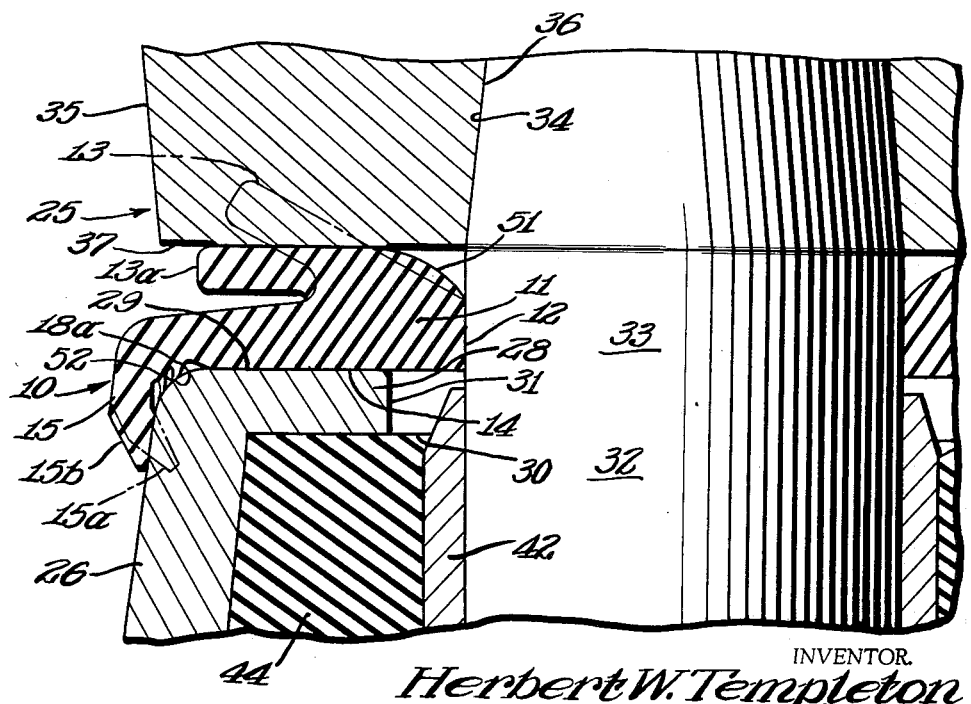
INVENTOR.
Herbert W. Templeton
BY
Hill, Sherman, Meroni, Gross & Simpson
ATTORNEYS Nov. 30, 1965  H. W. TEMPLETON  3,220,756
RESILIENT BOOT SEAL
Filed April 13, 1964  2 Sheets-Sheet 2
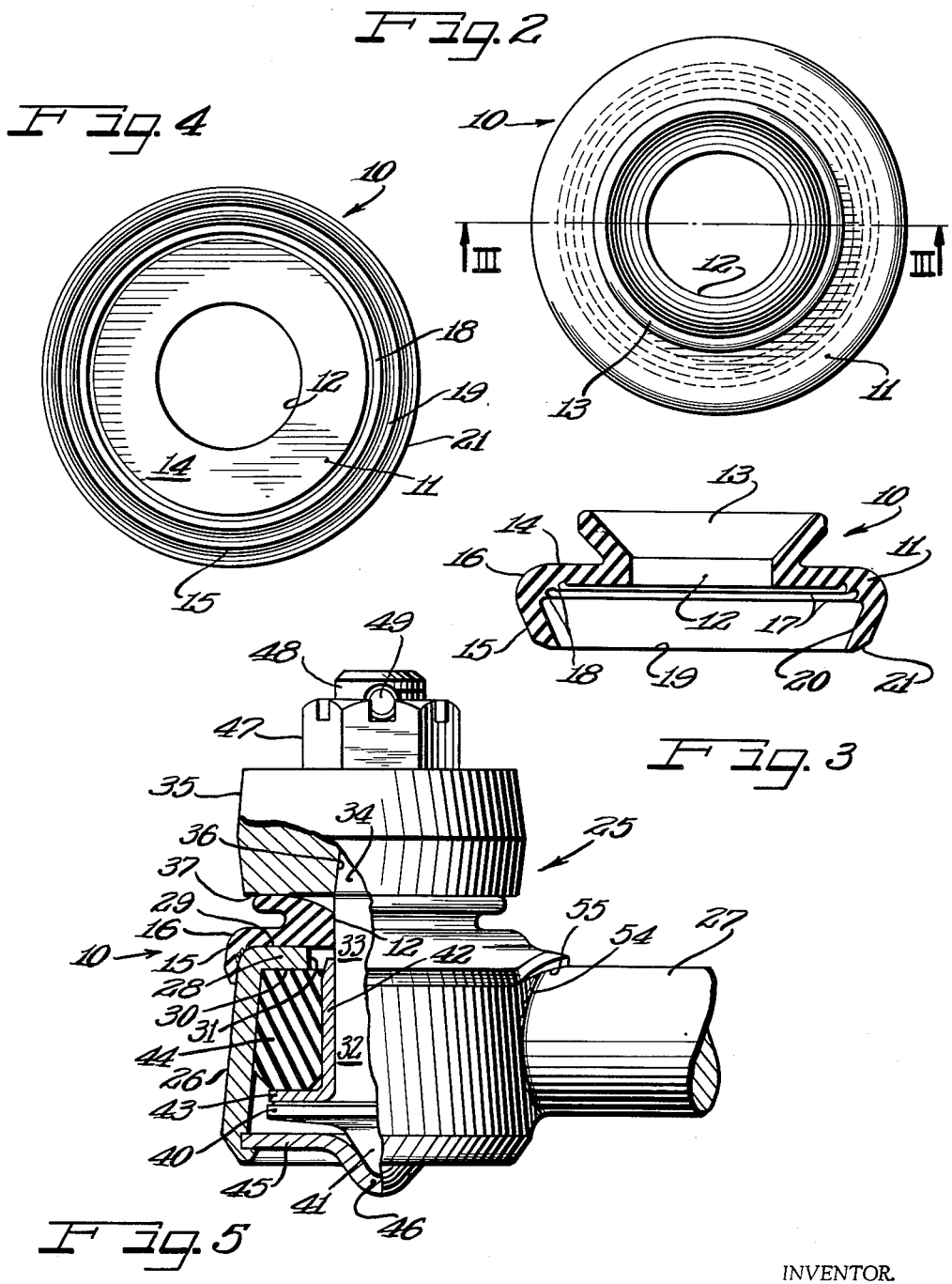
INVENTOR.
Herbert W. Templeton
BY
ATTORNEYS

United States Patent Office 3,220,756
Patented Nov. 30, 1965

3,220,756
RESILIENT BOOT SEAL
Herbert W. Templeton, Southfield, Mich., assignor to TRW Inc., a corporation of Ohio
Filed Apr. 13, 1964, Ser. No. 359,308
2 Claims. (Cl. 287—87)

This invention relates to a resilient boot seal, and more particularly to a seal of the type adapted for sealing an articulated joint assembly, such as a stud and socket type joint in which the stud has relative pivotal and rotatable movement with respect to the socket housing.

The resilient boot seal of my invention includes a molded flexible body, preferably composed of an oil-resistant rubber, such as Neoprene or a similar elastomeric material having inherent elasticity causing the body of the seal to tend to reclaim its original molded shape although accommodating deformation from said shape under deforming forces of moderate magnitude. The body is an open-ended annulus that is symmetrical about its axis and that is formed with a restricted intermediate throat portion, an upwardly and outwardly flared cup portion, and a lower radially extending planar portion having a downwardly and inwardly turned skirt portion. The body is of unitary, integral construction, which, because of its inherent elasticity, both axially and radially, requires no reinforcement, either internally or externally thereof.

A resilient boot seal of the form and construction that will be more particularly described hereinafter, and having the requisite degree of elasticity to be functionally sufficient in and of itself, without reinforcing elements associated therewith, is particularly adapted for the sealing of a joint assembly. The joint assembly for which my boot seal is particularly adapted, includes a socket housing, a stud tiltably and rotatably mounted in said housing and having a shank extending therefrom, and a connecting member secured to the shank, with said member and housing having generally planar surfaces in spaced but confronting relationship. In such an assembly, the resilient boot seal is positioned in relatively movable full sealing engagement with the planar surfaces of the connecting member and in static fixed sealing engagement with the socket housing. The resilient boot seal of my invention is provided with a dependent skirt portion which, in its free state, is radially inwardly tapered so as to grippingly engage the shoulder and the external surface therebeyond of the socket housing. As is quite customary in this type of joint, the socket housing has a generally planar upper surface joined by a smooth radius shoulder to a downwardly extending conical surface.

In such a joint assembly, the distance between the spaced, but confronting planar surfaces of the connecting member and of the housing is less than the free state height of the body of the boot seal, so that in operation the body is partially collapsed. Consequently, due to its inherent elasticity, the seal exerts an increased sealing pressure against the confronting surfaces of the connecting member and housing. Such sealing pressure is not, however, so great as to prevent the escape of lubricant between the sealing and sealed surfaces when the pressure of lubricant builds up to an undesirable pressure within the joint.

It is therefore an important object of this invention to provide a resilient boot seal of improved, simplified and relatively inexpensive construction that requires no added internal or external reinforcing means but is functionally self-sufficient for satisfactory sealing of the joint.

It is a further important object of this invention to provide a resilient boot seal for combination with an articulated joint assembly that includes a socket housing, a stud tiltably and rotatably mounted in the housing and having a shank extending therethrough, and a connecting member secured to the shank, with the boot seal so arranged and constructed and of such degree of elasticity as to effectively seal the interior of the joint assembly against the ingress of foreign material while permitting the escape of lubricant if excessive pressures of lubricant build up within the joint assembly.

Other and further objects of this invention will become apparent to those skilled in this art from the following detailed description of the annexed sheets of drawings, which, in by way of a preferred example only, illustrate one embodiment of the invention:

On the drawings:

FIGURE 1 is a perspective, broken-away view of a joint assembly at an intermediate stage, illustrating a resilient boot seal in association therewith;

FIGURE 2 is an enlarged top plan view of the boot seal unit of my invention;

FIGURE 3 is a sectional view taken substantially along the line III—III of FIGURE 2;

FIGURE 4 is a bottom plan view of the boot seal unit of FIGURES 2 and 3;

FIGURE 5 is a somewhat enlarged, elevational view partially broken-away and in section, of a completed joint assembly including my resilient boot seal; and FIGURE 6 is a greatly enlarged, fragmentary sectional view, with parts in elevation, similar to that of FIGURE 3, but showing in dotted lines the free-state condition of some of the cooperating portions of the boot seal.

As shown on the drawings:

The reference numeral 10 indicates generally a resilient boot seal of my invention. Said boot seal is preferably wholly composed of an oil-resistant synthetic rubber, such as Neoprene, or other elastomer, molded as an integral unit into an open-ended relatively thin-walled annular body 11 that is symmetrical about its axis. In its free state, as illustrated in FIGURES 2, 3, and 4, said body 11 is formed with a restricted, intermediate throat portion 12 that is generally cylindrical and of relatively short axial extent. An upwardly and outwardly flared cup portion 13 projects from said intermediate throat portion 12 as an integral continuation therefrom. A generally planar portion 14 extends radially outwardly from said throat portion 12 and is provided at its outer periphery with a dependent, radially-inturned skirt portion 15. Said planar portion 14 and skirt portion 15 are smoothly joined by an outer surface 16 that is curved about a radius, and by an inner surface that is generally conformingly curved but is provided with annular lip portions 17. Two such lip portions 17 are shown that are concentric and that provide inwardly directed, V-shaped ridges or serrations 18 when viewed in cross-section.

In its free state, as illustrated in FIGURES 2, 3 and 4, the skirt portion 15 terminates in an annular edge 19 of lesser thickness than the general wall thickness of the portion 15. This is for the reason that the inner surface of the skirt portion 15 is generally conical in shape, as indicated at 20 (FIG. 3), while the outer terminal surface of the skirt portion 15 is tapered radially inwardly, as at 21, to form the narrow edge 19.

The joint assembly, illustrated in FIGURES 1, 5 and 6 and indicated generally by the reference numeral 25, comprises a socket housing 26 formed on the end of a rod 27 for attachment to a connecting member, such as a tie rod, drag link or the like (not shown). As is quite customary, the housing 26 is formed on the end of the stem 27 as a relatively thin-walled shell of conical configuration, tapered upwardly and provided with an upper, inturned flange 28. Said inturned flange 28 has generally planar upper and inner surfaces 29 and 30 of annular form with an opening 31 axially thereof. A stud 32, disposed within said socket housing 26, has a cylindrical shank portion 33 that extends through said opening 31 and that is provided with a tapered portion 34 for receiving the end 35 of a connecting member, such as a pitman, or the like. Said connecting member end 35 is provided with a similarly tapered, conical inner surface 36 for wedging engagement with the tapered surface of the shank portion 34. The lower surface 37 of said end 35 is generally planar and extends in generally parallel, confronting but spaced relationship to the planar surface 29 of the housing 26 when the connecting member end 35 is properly positioned on the conical portion 34 of the shank 33.

The lower end of said stud 32 is provided with an enlarged head 40 provided with a conical shaped projection 41 axially dependent therefrom. A generally cylindrical bearing sleeve 42 surrounds said stud 32 and has a lower radially out-turned flange 43 seated against the enlarged head 40 of the stud. A bushing 44, usually of elastomeric material, and usually under load, cooperates with the bearing sleeve 42 to complete the bearing assembly within the socket 26 that provides for relative rotatable and tilting movement of the stud 32 with respect to the housing 26. A closure plate 45 closes the lower end of the housing 26 and affords a generally conical seat 46 for the stud projection 41 to permit relative turning and tilting movement of the stud 32. Additionally, the lower closure member 45 serves during completion of the assembly to pre-load the elastomeric bushing 44.

After assembly of the stud and bearing components within the housing 26, but before assembling the connection end 35 on the stud 32, the boot seal 10 of my invention is inserted over the upper free end of the stud 32 and the skirt portion 15 is expanded sufficiently to be slipped over the upper end of the housing 26, as shown in FIGURE 1. As there illustrated, the cup portion 13 of the boot seal 10 is in its free-state upstanding condition. To complete the assembly, the end 35 of the connecting member, is positioned upon the free end of the stud 32 with its inner conical surface 36 ready to be engaged with the conical portion 34 of the stud. Engagement is effected by threading home a castellated nut 47 on the upper threaded end 48 of the stud and securing the nut in place by a cotter pin or other retaining member 49.

Upon completion of the assembly, as illustrated in FIGURES 3 and 6, the boot seal 10 is axially partially collapsed between the generally planar surfaces 37 and 29, since these confronting surfaces are then spaced apart by a distance less than the free-state height of said boot seal 10. As a result of the collapsing pressure exerted against it, the cup portion 13 is deflected from its free-state position, indicated in dot and dash lines in FIGURE 6, to the generally radially extending full line position indicated by the reference numeral 13a. A good contacting engagement between the surface 37 and the cup 13 is thus maintained. As a further result of the collapsing of the boot seal between the confronting surfaces 37 and 29, a certain amount of cold flow of the material of the seal takes place to cause the throat portion 12 of the seal to be urged into good contacting engagement with the cylindrical outer surface of the stud 32 and to cause the material of the seal 10 to bulge somewhat radially inwardly and upwardly, as at 51.

FIGURE 6 also illustrates the change taking place in the contour in section of the lower skirt portion 15 when the boot seal 10 is expanded from its free-state condition, shown in dot and dash lines 15a to its housing-engaging position indicated in full lines at 15b. Thus, when the joint is in fully assembled state, the skirt portion 15b tightly engages the generally conical surface of the housing 26, with the lips 18a in close engagement with the radius surface 52 (FIG. 6) forming the external shoulder of the housing 26. Further, the cup 13 and the throat 12 snugly seat on the surface 37 of the connecting member end 35 and the cylindrical shank portion 33 of the stud, but do not grip these surfaces with sufficient tightness to interfere with rotation of these parts within the boot while at the same time the engagement is sufficiently snug to effect a seal.

There is thus provided an effective face seal between the relatively rotating spaced, but confronting planar surfaces 37 and 29 of the connecting member end 35 and of housing 26, respectively. Also, while the amount of collapse and distortion of the boot seal 10 will depend upon the space between said confronting surfaces 37 and 29, the collapsing force is always of sufficient magnitude to produce an axial load on the seal which is transferred through the body of the seal to produce a full tight grip seating and sealing of the skirt portion 15b against the generally conical surface of the housing 26 and the engaging of the plurality of annular lips 18a with the radius surface 52.

The flexibility and elasticity of the skirt portion 15 is also such as to provide a closely conforming seal as at 55 at the junction 54 (FIGS. 1 and 3) between the stem 27 and its end portion 35. Due to its inherent elasticity, the seal is thus self-compensating for changes or irregularities in the surfaces to be sealed, as well as dimensional and assembly variations, and variations due to wear.

The resilient boot seal of my invention is both effective and relatively inexpensive to manufacture. It requires no special machining of the components that it sealingly engages, and it requires no special clamps, inserts, reinforcements or any other devices of a similar nature for effectively providing a static fixed sealing engagement with the socket housing and sliding sealing engagements with the planar surface of the connecting member and cylindrical surface of the stud fastening the seal to the joint assembly. My seal provides four definite sealing barriers against the entry of foreign materials, contaminants and the like, namely, at the surface engagement of the cup portion 13a with the planar surface 37; at the surface engagement of the throat portion 12 with the stud 32; at the surface engagement between the skirt portion 15b and the conical surface of the housing 26; and at the narrow surface or line engagement between the plurality of annular lips 18a with the radius surface 52. At the same time, if the pressure of lubricant within the housing builds up beyond a certain point, excess pressure may be relieved by the flow of lubricant outwardly between these engaging and sealing surfaces without loss of the effectiveness of the sealing of the joint assembly against ingress of foreign material.

It will be understood that modifications and variations may be effected without departing from the scope of the novel concepts of the present invention.

I claim as my invention:

1. In combination with a joint assembly including a socket housing of frusto-conical configuration having an exteral surface including an annular radially extending planar end portion of substantial extent defining an aperture, a downturned axially extending annular conical sidewall portion and an annular smoothly rounded shoulder joining said portions, a stud tiltably and rotatably mounted in said housing and having a shank extending therefrom, and passing through said aperture, and a connecting member secured to said shank having a lower radially extending planar surface of substantially the same extent as said first-mentioned planar surface portion, the planar surfaces of said member and of said housing inwardly of said shoulder being in spaced confronting relationship, a boot seal mounted on said stud between said planar surfaces to seal said joint assembly, said boot seal comprising an integral structure, an open-ended annular body symmetrical about its axis and having a narrow throat portion sealingly engaging said stud, and an upwardly and radially outwardly flared cup portion extending from said throat portion away from said axis and sealingly abutting said member planar surface in extended face-to-face contact therewith, a radially outwardly extending planar portion also extending from said throat portion in extended surface abutting relationship with said housing planar surface and said planar portion terminating in an axially downturned annular skirt portion resiliently gripping said housing shoulder and said annular conical portion, said skirt portion being inherently resilient and initially radially inwardly flared toward said axis so as to enhance its gripping engagement with the sidewall of said housing below said shoulder to sealingly enclose said shoulder due to the inherent elasticity of said skirt portion.

2. In the combination defined by claim 1, the improvement wherein the intersection of said radially outwardly extending planar portion and said skirt portion having ridges on the inner periphery thereof.

References Cited by the Examiner

UNITED STATES PATENTS

| | | |
|---|---|---|
| 2,569,823 | 10/1951 | Moskovitz. |
| 2,752,180 | 6/1956 | Vogt _____ 287—87 |
| 2,910,316 | 10/1959 | Dier. |
| 2,957,713 | 10/1960 | Herbenar. |
| 3,112,123 | 11/1963 | True. |

FOREIGN PATENTS

| | | |
|---|---|---|
| 889,715 | 10/1943 | France. |

CARL W. TOMLIN, *Primary Examiner.*